United States Patent Office 3,031,308
Patented Apr. 24, 1962

3,031,308
IRISH MOSS FOOD PRODUCT
Alfred D. Campbell, Clinton, Iowa, assignor to Standard Brands Incorporated, New York, N.Y., a corporation of Delaware
No Drawing. Filed Dec. 21, 1959, Ser. No. 860,645
7 Claims. (Cl. 99—131)

The invention relates the compositions suitable for the preparation of edible gels containing Irish moss extractives as gelling agents and edible acids as flavoring agents.

Irish moss is a seaweed, a member of the Gigartinaceae. The term "Irish moss extractives" designates water-soluble extracts of the raw moss, composed chiefly of the polysaccharide of carrageenan, also known as carrageenin and gelose. The use of Irish moss extractives as a gelling agent for the preparation of edible gels is well known. For example, Alexander Frieden and Sanford J. Werbin (U.S.P. 2,427,594) describe the addition of potassium and ammonium salts to enhance the gelling and thickening ability of these extractives. The Frieden and Werbin composition yield stiff, brittle jelly-like masses that lack elasticity and resemble pectin gels. George L. Baker (U.S.P. 2,466,146) describes the addition of certain colloidal agents and neutral high polymers such as locust bean gum to compositions of the Frieden and Werbin type in order to obtain elastic gels resembling those obtained with gelatin.

Citric acid is usually employed to give edible gels a tart taste. The Baker patent describes its use along with sodium citrate to obtain the desired acidity in gels made from Irish moss extractives. However, Baker notes that acids have an "aggressive hydrolytic action" on the Irish moss extractives.

We have found that dry mixes comprised of Irish moss extractives and citric acid have poor keeping qualities in that a suprisingly fast deterioration in the gelling power of the Irish moss extractives takes place on storage.

An object of the invention is to provide a mixture of Irish moss extractives and an edible acid having enhanced keeping qualities.

A further object of the invention is to provide a mixture comprising Irish moss extractives and an edible acid which does not undergo degradation when stored for long periods of time.

We have found that these objects can be achieved by employing fumaric acid and/or adipic acid to replace the citric acid in whole or in part in mixes comprising Irish moss extractives and an edible acid.

The invention may be illustrated by the compositions given in the tables below which are recited for purposes of illustration only and are not to be regarded as limiting the scope of the inventon in any way. Quantities are given in grams.

| Compositions | I | II | III | IV |
|---|---|---|---|---|
| Sucrose | 86.00 | 91.00 | 72.00 | 143.00 |
| Irish moss extractives | 1.36 | 2.40 | 1.40 | 4.00 |
| Potassium chloride | 0.64 | 0.06 | 1.40 | 0.60 |
| Locust bean gum | 1.30 | 1.30 | 1.30 | |
| Starch | | | | 16.00 |
| Non-fat dry milk solids | | | | 4.00 |
| Fumaric acid | 1.4 | 1.4 | 1.30 | 2.25 |
| Sodium citrate | | | 1.80 | |
| Sodium fumarate | 1.6 | 1.6 | | |

In the compositions given in the above table the fumaric acid may be replaced in whole or in part by adipic acid in an amount to give approximately the same pH in the finished gel. For instance, in Composition III the fumaric acid may be replaced by 4.00 grams of adipic acid.

These compositions may be prepared by simply mixing the ingredients in dry powdered form in any desired order. Small amounts of coloring and/or flavoring materials may be included if desired. To prepare the dessert gel the mix is stirred into one pint of boiling water until dissolved and then the solution is allowed to set to a gel. Preparation of the gel from Composition IV is facilitated by use of an egg beater or electric mixer.

The solutions are viscous liquids which set into form-retaining gels on cooling. Compositions I to III are designed to give elastic resilient gels that resemble gelatin gels. Composition IV is suitable for preparation of a filling for lemon meringe pies. The starch used may be raw or precooked or a combination of both.

In the compositions described above the potassium chloride may be omitted although this is not practical or economical because much larger amounts of the Irish moss extractives would be required for gelling. The potassium chloride may be replaced by any other edible salt capable of enhancing the gelling properties of the Irish moss extractives including any of the potassium and ammonium salts described in the Frieden and Werbin patent.

The amounts of the various ingredients may vary widely. The Irish moss extractives are used at least in sufficient amount to cause gelation. As the only function of the fumaric acid and/or adipic acid is to impart tartness they can be used in any desired amount to suit the taste. The level of potassium chloride, or other salt used for the same purpose, will depend upon the desired gel strength for the particular level of Irish moss extractives used as well as on the desired gelling and/or melting temperature of the gel. The level of sugar depends entirely on taste considerations. It may be replaced by any edible sweetening agent.

The sodium citrate and sodium fumarate serve as buffers. The buffer may be omitted if desired. Any edible buffer may be used including various sodium and potassium salts such as sodium fumarate, sodium acid fumarate, potassium citrate, sodium adipate and potassium tartrate.

The locust bean gum and raw or precooked starch are used in an amount to give the finished gel the desired texture.

Suitable levels in grams of the various ingredients for use with one pint of water are, for example:

| | |
|---|---|
| Irish moss extractives | 1.0– 6.0 |
| Potassium chloride | 0 – 2.0 |
| Fumaric acid | 0 – 4.0 |
| Adipic acid | 0 – 10.0 |
| Sucrose | 50.0–150.0 |
| Locust bean gum | 0 – 5.0 |
| Raw starch | 0 – 25.0 |
| Precooked starch | 0 – 40.0 |
| Sodium citrate | 0.5– 2.0 |

The invention includes any dry mixture of Irish moss extractives and an acid selected from the group consisting of adipic and fumaric acids adapted to form a gel with water, with or without other ingredients. Citric acid exerts its deteriorative action on Irish moss extractives in mixes containing these two substances only as well as in mixes containing other substances in addition. Moisture pick up appears to play only a negligible role in this deteriorative action.

This application is a continuation-in-part of Serial No. 682,083, filed September 5, 1957, now abandoned.

I claim:
1. A dry mix of the class described comprising carrageenin and fumaric acid.
2. A dry mix of the class described consisting essentially of carrageenin, a salt capable of enhancing the gelling properties of the carrageenin and fumaric acid.

3. A dry mix as claimed in claim 2 wherein the salt is potassium chloride.

4. A dry mix as claimed in claim 2 wherein the salt is potassium tartrate.

5. A dry mix as claimed in claim 2 containing locust bean gum.

6. A dry mix as claimed in claim 2 containing starch.

7. A dry mixture of comminuted edible materials, adapted to form a gel on dissolution in water, comprising a gelling ingredient and flavoring acid, the gelling ingredient consisting essentially of carrageenin and the flavoring acid consisting essentially of fumaric acid.

References Cited in the file of this patent

UNITED STATES PATENTS

| | | |
|---|---|---|
| 2,412,305 | Stokes et al. | Dec. 10, 1946 |
| 2,466,146 | Baker | Apr. 5, 1949 |
| 2,698,803 | Common et al. | Jan. 4, 1955 |
| 2,864,706 | Stoloff | Dec. 16, 1958 |